M. KOVACH.
AUTOMOBILE FENDER.
APPLICATION FILED JULY 23, 1921.

1,402,502.

Patented Jan. 3, 1922.
2 SHEETS—SHEET 1.

Inventor
M. Kovach.
By Lacey & Lacey, Attorneys

M. KOVACH.
AUTOMOBILE FENDER.
APPLICATION FILED JULY 23, 1921.
1,402,502.
Patented Jan. 3, 1922.
2 SHEETS—SHEET 2.
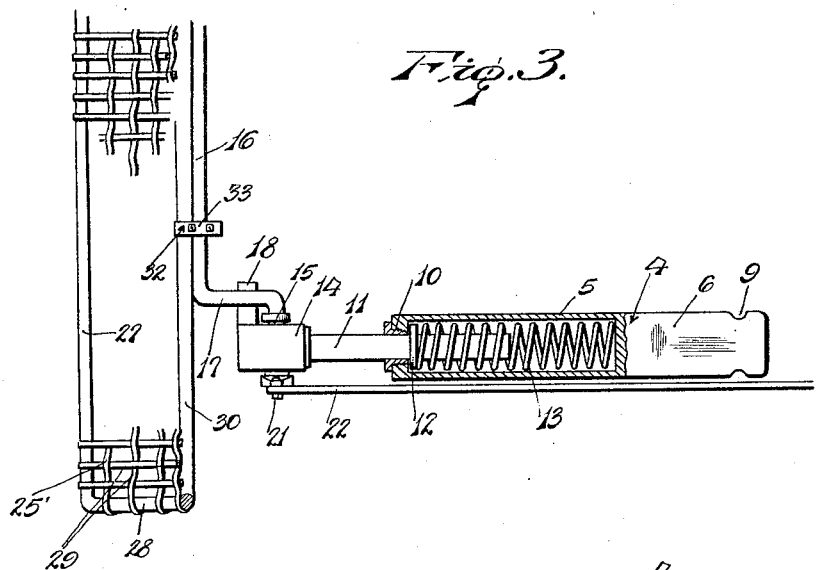
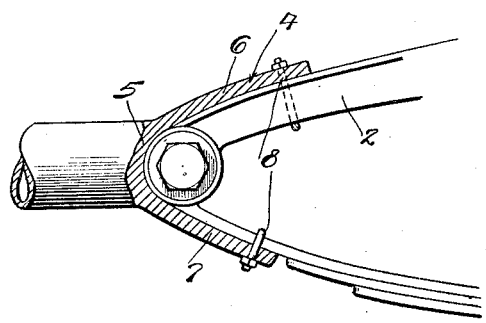
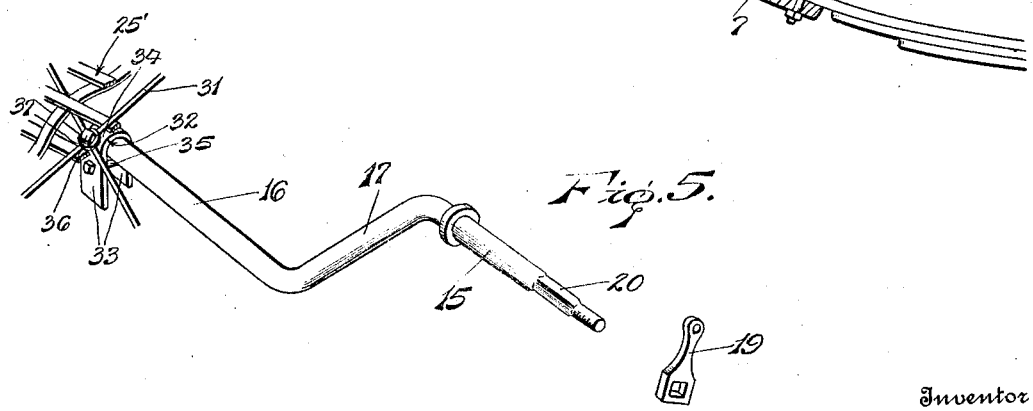
Inventor
M. Kovach.
By Lacey & Lacey, Attorneys

UNITED STATES PATENT OFFICE.

MATHIAS KOVACH, OF ELY, MINNESOTA.

AUTOMOBILE FENDER.

1,402,502.　　　Specification of Letters Patent.　　Patented Jan. 3, 1922.

Application filed July 23, 1921.　Serial No. 487,060.

*To all whom it may concern:*

Be it known that I, MATHIAS KOVACH, a citizen of the United States, residing at Ely, in the county of St. Louis and State of Minnesota, have invented certain new and useful Improvements in Automobile Fenders, of which the following is a specification.

This invention relates to automobile fenders and has as one of its objects to provide a fender which may be readily mounted upon the front of an ordinary type of automobile without the necessity of altering the construction of the same or in any way interfering with its operation.

Another object of the invention is to provide a fender which will normally occupy a lowered position so as to best serve its purpose but in connection with which means is provided whereby the fender may be elevated so as to adapt it to clear obstructions in the roadway over which the machine is being driven.

Another object of the invention is to provide novel means for supporting the body of the fender so that the force of impact will be cushioned and likelihood of injury to the person greatly lessened.

In the accompanying drawings:

Figure 3 is a view partly in top plan and partly in horizontal section looking at one end of the fender structure;

Figure 4 is a view partly in side elevation and partly in vertical section illustrating the manner in which the fender structure is to be mounted upon the front springs of the vehicle;

Figure 5 is a perspective view of a portion of the supporting shaft for the fender and parts associated therewith.

Figure 1:
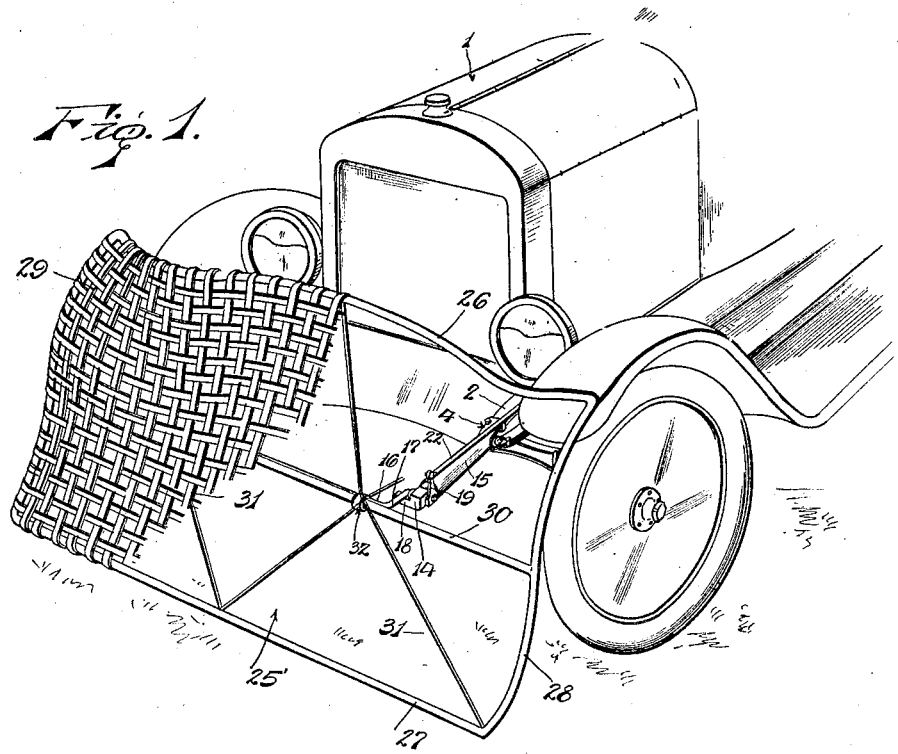
Figure 1 is a perspective view of the fender embodying the invention in use, a part of the web of the fender being broken away to better illustrate the construction and arrangement of other parts.

In the drawings, the numeral 1 indicates in general so much of an automobile as is necessary to illustrate the application of the fender of the present invention, the front elliptical springs being indicated by the numeral 2 and the floor of the car by the numeral 3. The fender is supported upon a shaft which has cranked portions mounted in supporting bearings which are adaptable to the springs 2 at the time the fender is installed. Each of the said bearings comprises a barrel which is indicated by the numeral 4 and which is provided with a closed end 5 having upper and lower spaced diverging attaching plate portions 6 and 7 respectively which are secured as for example by U-clips or bolts 8 to the upper and lower bows of the respective spring 2, the said attaching plate portions 6 and 7 being provided in their opposite edges with notches 9 to receive the said portions of the attaching bolts or clips 8. Removably fitted into the open outer or forward end of each barrel 4 is a bushing 10 through which is slidably fitted a stem 11, the stem being provided, interiorly of the barrel 4, with a collar or other suitable abutment means 12 which normally rests against the inner end of the bushing 10, and is held in a forwardly projected position through the medium of a spring 13 which is arranged within the barrel and bears at one end against the closed end 4 thereof and at its other end against the said collar 12. It will be evident that any inward movement of the stems 11 is against the tension of the springs 13. Each stem 11 is provided at its outer end with a head 14 constituting a bearing for the respective cranked end 15 of a shaft 16, the cranks at the ends of the shaft being indicated by the numeral 17. The heads 14 are provided upon their relatively opposed sides with lateral inwardly projecting supporting lugs or bosses 18, and by reference to Figures 1 and 3 of the drawings, it will be observed that normally the cranked ends 17 of the shaft 16 will rest upon these supporting lugs or bosses 18 so that the shaft will be supported substantially horizontally although capable of having its intermediate portion swung upwardly when the shaft is rocked in its bearings. In order that the shaft may be so rocked, a crank arm 19 is fitted onto a squared portion 20 of one end of the shaft and secured by a nut 21, and a rod 22 is pivotally connected with the upper end of this arm and extends rearwardly to a point beneath the floor 3 of the vehicle and is connected, as at 23, to the lower end of a foot lever 24 supported by a suitable mounting 25 arranged within an opening in the floor 3. As the foot lever 24 is not restrained from rocking movement except so far as regards its connection with the rod 22, the provision of the operating lever in connection with the shaft 16, does not interfere with the rearward movement of the shaft against the tension of the springs 13 as such movement will not be resisted by the foot lever 24, but the said lever will merely be rocked in its mounting. Furthermore the lever is operable for the purpose of rocking the shaft 16 regardless of whether the shaft and its bearings are in the normal forwardly projected positions or have been thrust rearwardly through impact of the fender with a body.

The fender proper is indicated in general by the numeral 25 and the same comprises an approximately rectangular frame including upper and lower cross bars indicated respectively by the numerals 26 and 27 and side bars 28. The side bars 28 are forwardly curved throughout their lower portions and rearwardly curved throughout their upper portions, and the upper cross bar 26 is outwardly curved or bulged adjacent its two ends where it joins the upper ends of the side bars 28. The fender web is indicated by the numeral 29 and the same is arranged within the frame above described and is made to conform generally to the curvilinear contour of the frame parts so that it will present a surface of a contour to best adapt the fender to thrust aside or catch a person struck thereby. The fender web 29 may be of any suitable material and constructed in any suitable manner but is preferably in the nature of a lattice of metal strips suitably assembled and arranged and in order to brace the fender frame the same is provided between its upper and lower cross bars 26 and 27 with an intermediate transverse bar 30 and with intersecting diagonal brace rods 31 arranged in any desired manner. By reference to Figures 1, 3 and 5 of the drawings, it will be observed that the transverse frame bar 30 is disposed parallel to and substantially in contact with the intermediate portion of the shaft 16 and secured thereto by means of U clips 32, these clips comprising spaced portions 33 and an intermediate or connecting portion 34 which latter is disposed to embrace the upper side of the said intermediate portion of the shaft 16, a securing or clamping bolt 35 being fitted through the spaced members 33 of the clip below the shaft 16 and being tightened to bind or clamp the clip to the shaft. A stud bolt 36 is threaded into one of the members 33 of the clip and is provided with a washer 37 which binds in place the intermediate bar 30, brace rods 31, and strips comprising the web 29 of the fender and clamps these parts to the attaching clips 32.

Figure 2:
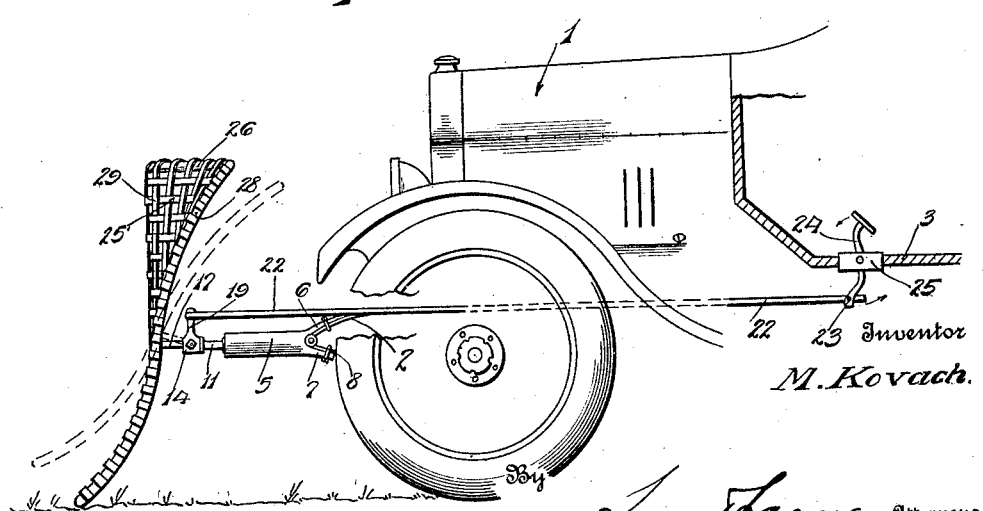
Figure 2 is a side elevation of the fender in use, the same being shown in full lines in lowered position and in dotted lines in partly elevated position.

It will now be evident that normally the fender will occupy an upright but relatively lowered position as shown in full lines in Figures 1 and 2 of the drawings, the cranked portions 17 of the shaft 16 resting upon the bosses 18 so as to substantially rigidly support the fender in this position although at the moment of impact it may be forced rearwardly against the tension of the springs 13 and the force of impact thus minimized. When occasion requires, the fender may be elevated and tilted rearwardly by pressing forwardly upon the foot lever 24 whereupon the crank arm 19 will be swung rearwardly and the shaft 16 will be correspondingly swung.

Having thus described the invention, what is claimed as new is:

1. In a device of the class described, spaced supporting bearings, means yieldably holding the bearings projected in a forward direction, the shaft having cranked portions journaled in the bearings, means operable to rock the shaft, and a fender supported by the shaft.

2. In a device of the class described, spaced supporting bearings, means yieldably holding the bearings projected in a forward direction, the shaft having cranked portions journaled in the bearings, means operable to rock the shaft, and a fender supported by the shaft, the said supporting bearing being provided with means upon which the cranked portions of the shaft normally rest whereby the shaft is positively supported against downward swinging movement.

3. In a device of the class described, spaced supporting means each comprising a barrel, a stem slidable within the barrel, a spring yieldably resisting inward sliding movement of this stem, bearing heads at the outer ends of the stems, a shaft having cranked portions journaled in said bearings, means operable to rock the shaft, and a fender supported by the shaft.

4. In a device of the class described, spaced supporting means each comprising a barrel, a stem slidable within the barrel, a spring yieldably resisting inward sliding movement of this stem, bearing heads at the outer ends of the stems, a shaft having cranked portions journaled in said bearings, means operable to rock the shaft, and a fender supported by the shaft, the said bearing heads being provided with lateral bosses for the support of the cranked ends of the shaft.

5. A fender comprising a frame having upper and lower cross members and side members extending between the same and curved forwardly throughout their lower portions and rearwardly throughout their upper portions, the upper cross member of the frame being outwardly curved adjacent each end, and a webbing extending over said frame and having a contour corresponding substantially to the curvature of the frame members.

In testimony whereof I affix my signature.

MATHIAS KOVACH. [L. S.]